Nov. 20, 1934. J. DICHTER 1,981,692
FEEDING MEANS FOR GLASS TUBE MANIPULATING MACHINES
Filed April 20, 1933 3 Sheets-Sheet 1
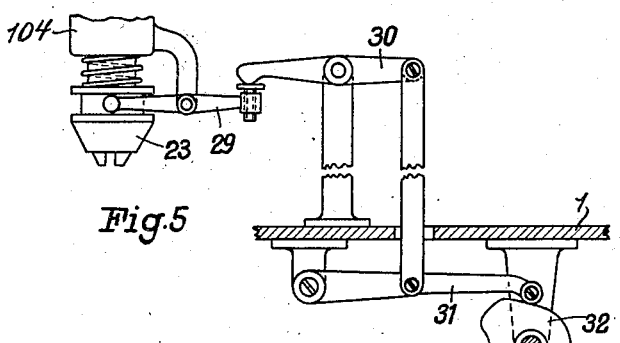
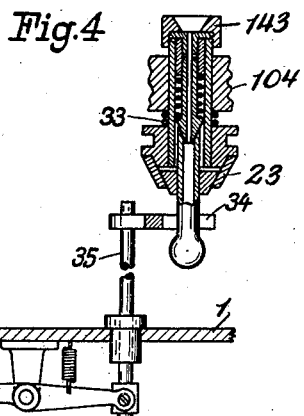
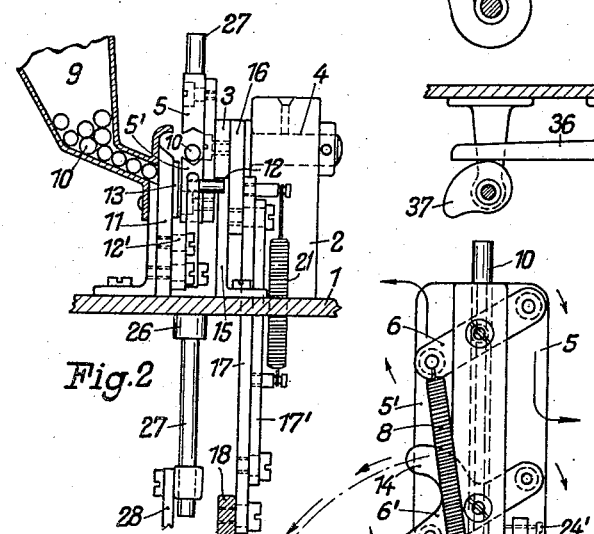
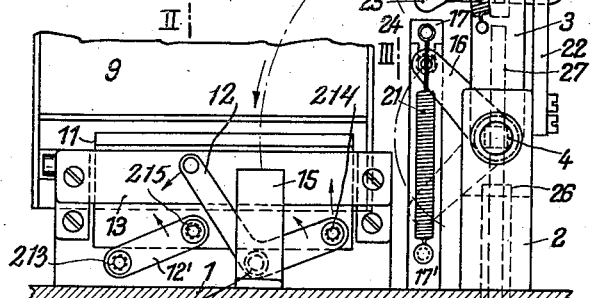
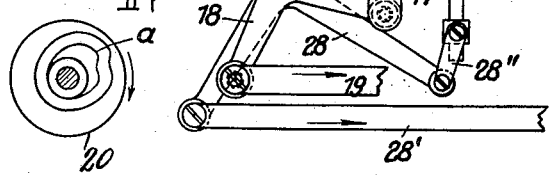
Inventor:

Nov. 20, 1934. J. DICHTER 1,981,692
FEEDING MEANS FOR GLASS TUBE MANIPULATING MACHINES
Filed April 20, 1933 3 Sheets-Sheet 2
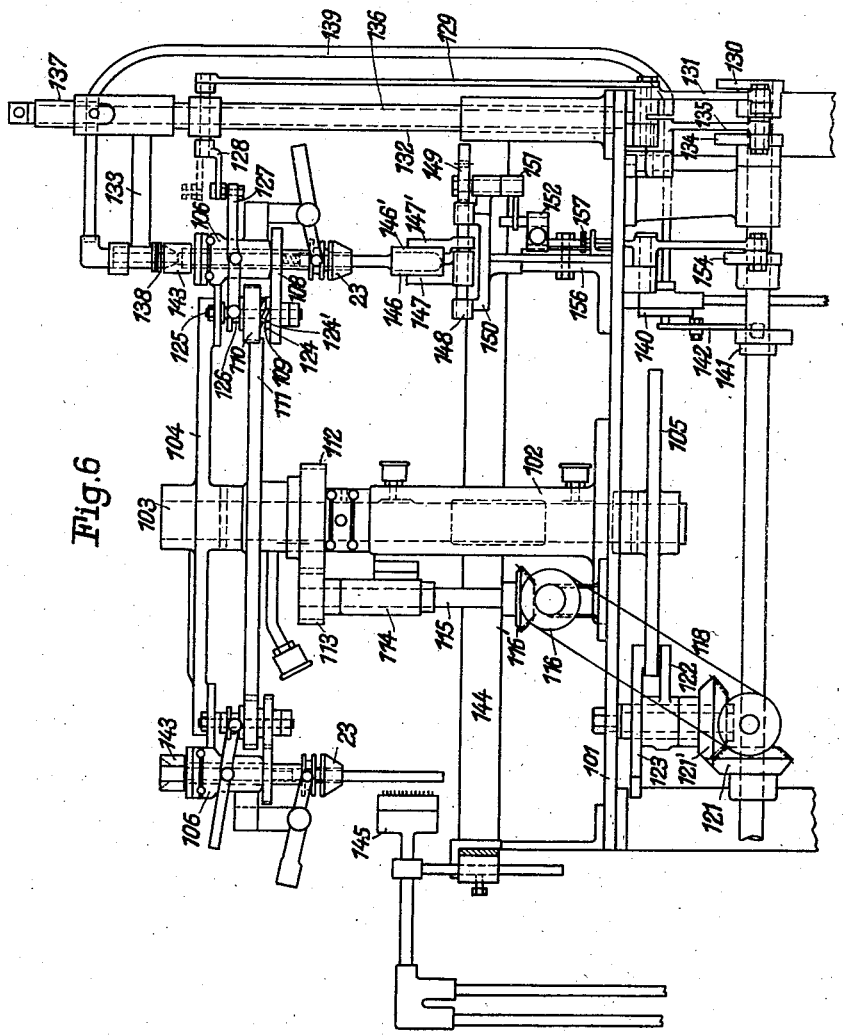
Inventor:
Jakob Dichter

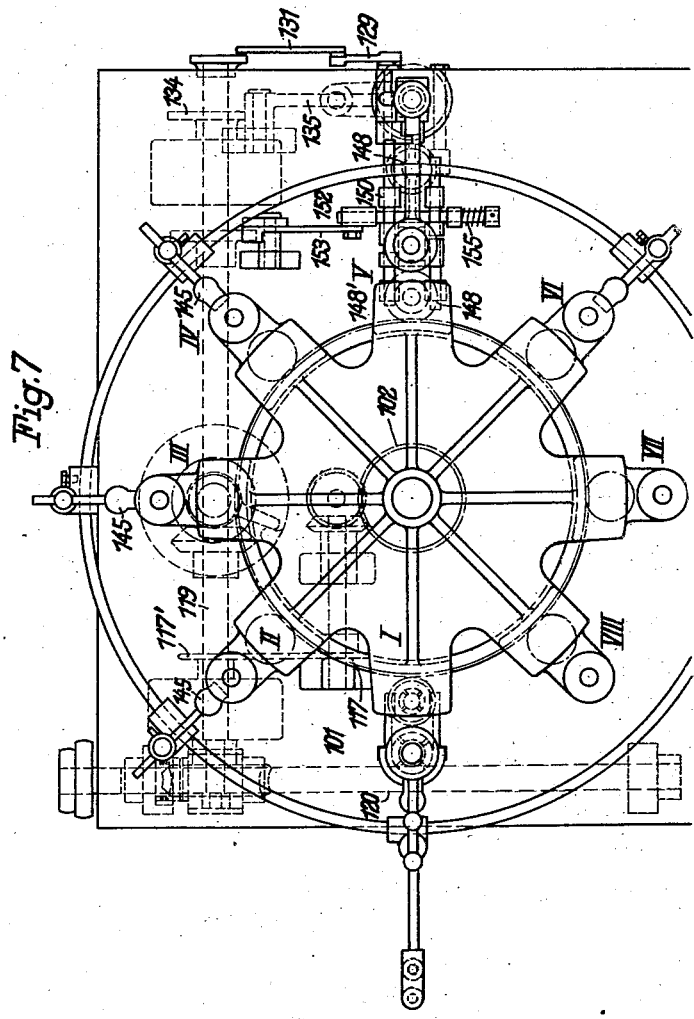

Patented Nov. 20, 1934

1,981,692

UNITED STATES PATENT OFFICE 1,981,692

FEEDING MEANS FOR GLASS TUBE
MANIPULATING MACHINES

Jakob Dichter, Schoneberg, Berlin, Germany

Application April 20, 1933, Serial No. 667,067
In Germany April 27, 1932

11 Claims. (Cl. 49—7)

My invention relates to a machine for molding glass tubes and more particularly to a mechanism for feeding the tubes to the molding mechanism of the machine.

It is an object of my invention to provide an improved machine of the kind described. To this end, in combination with a mechanism for molding, i. e., heating and expanding the tubes, I provide feeding mechanism which comprises a container for a supply of glass tubes to be molded, means such as a pusher and a gripper for presenting the individual tubes from the container to the molding mechanism, and means such as a push rod for pushing the tubes into position to be engaged by the molding mechanism, preferably by chucks on the molding mechanism.

In the first place the feeding mechanism will be described. The use of the feeding mechanism in a mould glass blowing machine is shown by way of example. In it the cut-off tube lengths are closed at one end and are disposed horizontally in a supply container. They are then fed to the chucks on the molding mechanism which are arranged vertically about a central axis. The chucks are advanced step by step and the closed end of the glass tube is shaped by blowing.

In the drawings affixed to this specification and forming part thereof a molding machine embodying my invention is illustrated diagrammatically by way of example.

In the drawings

Fig. 1 is a partly sectional elevation of the feeding mechanism, showing it in the position in which it presents a tube to one of the chucks on the molding mechanism at the feeding station, Fig. 2 is a section on the line II—II in Fig. 1, showing the feeding mechanism in the position in which it receives a tube from its container, Fig. 3 is a section on the line III—III in Fig. 1, Fig. 4 is a partly sectional elevation of stripping means for stripping a finished tube from a chuck of the molding mechanism, Fig. 5 is a partly sectional elevation of means for closing one of the chucks of the molding mechanism about a tube, Fig. 6 is a side view of a rotary molding mechanism, and Fig. 7 is a plan corresponding to Figure 6.

The molding mechanism which will be described in full detail below, will now be described briefly for facilitating the understanding of the operation of the feeding mechanism. Referring to Figs. 6 and 7, the molding mechanism is first equipped with a rotary spider 104 on a shaft 103 to which intermittent rotation is imparted. The spider has eight arms, each of which supports a chuck 23 for the reception of one of the glass tubes 10 from the container 9, Figs. 1 and 2. A complete cycle of operations is subdivided into eight stations I to VIII, Fig. 7, and the spider 104 is indexed periodically through one eighth of a revolution. Station VIII is the feeding station where fresh tubes 10 are presented to the chucks 32 as they are arrested at station VIII. The feeding mechanism has been omitted at station VIII in Fig. 7. It is understood that the mechanism is so positioned at the station that it presents the glass tubes 10 to the chucks 23 in axially aligned relation. At stations I to IV, the tubes are gradually heated by gas burners 145, at station V they are molded and expanded by compressed air, at station VI they are allowed to cool, and at station VII they are stripped from the chucks by the means illustrated in Fig. 4.

Referring now to Figs. 1, 2 and 3, 1 is the base plate of the feeding mechanism which plate may be integral with the base plate or frame 101 of the molding mechanism, or may be a separate member. A bearing block 102 is arranged on the base plate 1, and a gripper arm 3 is mounted to oscillate about a pivot 4 in the block 2. By means which will be described, this arm is oscillated through 90 degs. from the vertical position illustrated in Figs. 1 and 3, into the horizontal position illustrated in Fig. 2, and back. The arm 3 supports a pair of gripping or clamping jaws 5 at opposite sides of its central line. The inner edges of the jaws 5 and 5' are recessed in the shape of the letter V as shown in Fig. 2, for engaging one of the tubes 10. The jaws are pivotally connected to a pair of double-armed levers 6 and 6' which are fulcrumed on the arm 3 at their centres. A spring 8 which is attached to the arm 3 at its lower end, and to the pivot where the upper double-armed lever 6 is pivoted to the jaw 5', at its upper end, tends to close the jaws 5, 5' about the tube 10 they have engaged.

A supply of glass tubes 10, which, in the present instance, are closed at one end, is stored in the container 9 (Fig. 2). The tubes enter an oblique outlet passage at the bottom of the container 9 and are retained by a reciprocating pusher 11 the upper edge of which is beveled. The pusher is supported on a bellcrank lever 12 (Fig. 1) and on a link 12'. The lever and the link are fulcrumed on a suitable bracket on plate 1 at 212 and 213, respectively. The shorter arm of the bellcrank lever 12 is pivotally connected to the pusher 11 at 214, and the upper end of link 12' is pivotally connected to the pusher at 215. By these means, the pusher 11 is raised when the longer arm of the bellcrank lever 12 is engaged by the gripper arm 3 as the arm moves into its horizontal position (Fig. 2) and a tube 10 enters between the jaws 5, 5'. When the arm 3 releases the bellcrank lever 12 the pusher 11 returns by gravity into its initial position in which it allows one of the tubes to move into engagement with a stop plate 13 in which position the tube is ready to be raised upon the subsequent upward movement of the pusher 11.

On the downward motion of the arm 3 in the position of Fig. 2 the clamping jaws 5, 5' open in that the lever 6' which has an arm 14 encounters a stop 15.

An arm 16 is secured on the pivot 4 of the gripper arm 3 which arm in its initial position illustrated in Fig. 1, extends upwardly at an angle of 45 degrees and connected by the plate 17 with the cam 20 by way of the pitman 19 and bell crank lever 18. The plate 17 is provided with a second plate 17' which is connected to it by bolts and is displaceable in slots. The two plates are held in the end position determined by the slots by means of the spring 21. The spring 21 is so dimensioned that through the intermediary of a linkage the cam 20 can bring the arm 3 from the horizontal into the vertical position. In the vertical position the arm 3 encounters the stop screw 24' disposed on the stop 22 which ensures the central position of the clamping jaws 5, 5' and thus of the glass tube 10 with respect to the chuck 23, when the tube is presented to the chuck at the feeding station VIII in aligned relation.

By means of the double plates 17, 17' the clamping jaws 5, 5' are opened when the glass tube is introduced into the chuck 23, in that the cam 20 continues to press against the plate 17 through the linkage due to the projection provided at "a", so that the spring 21 and thus the plate 17' is further raised and presses with the abutment surface 24 against the projection 25 on the lever 6'.

In the bearing 26 is the push rod 27 which is displaceable up and down and is adapted to the diameter of the glass tube and which is raised and lowered by means of a bell crank lever 28, links 28' and 28'', and a cam, not shown. The push rod 27 bears against the closed end of the glass tube 10 when this is disposed opposite the opened chuck 23 at station VIII and pushes the glass tube through the prismatic recess in the clamping jaws 5, 5' and supports it until it is gripped by the chuck.

The opening and closing of the chuck 23 is effected by the levers 29, 30, 31 and cam 32, at station VIII, as shown in Fig. 5.

At station VII, as shown in Fig. 4 the shaped glass body is drawn out of the rubber seal 33 and the opened chuck in that a fork 34 engages about the spherical enlargement and thus when the rod 35 slides downwardly the glass body is drawn out of the chuck by the lever 36 and cam 37.

The mode of operation of the arrangement is as follows:

The gripper arm 3 with the opened clamping jaws (Fig. 2) is in horizontal position in front of the feed way of the container 9. When the gripper arm moves downwardly the glass tube lying against the stop bar 13 is lifted by the pusher 11 to such an extent that it rolls between the opened gripper jaws 5, 5'. By means of the cam 20 the linkage 16, 18, 17, 16 the gripper arm is swung through 90 degrees so that the glass tube arrives beneath the chuck 23. After the gripper arm has swung a little out of the horizontal, the lever 14 leaves the stop 15 so that the glass tube 10 is held by the clamping jaws 5, 5' under the action of the spring 8.

As soon as the gripper arm is in vertical position beneath the chuck 23 the latter is opened by the cam 32 at station VIII by way of the levers 31, 30, 29 and the push rod 27 pushes the glass tube through the clamping jaws 5, 5' until it encounters a blast nozzle which is arranged below a sealing head 143 at the upper end of every chuck 23 (Fig. 4) and is provided at its end with a rubber seal. The chuck 23 then closes so that the glass tube is held thereby.

Before the chuck 23 is advanced into the next working position the clamping jaws 5, 5' are opened by the cam 20 to such an extent that in the further advance the glass tube can emerge therefrom laterally. At the same time after opening the chuck 23 the finished glass body is withdrawn therefrom by the arrangement of Fig. 4 at station VII. As soon as the glass tube has been moved out of the clamping jaws the gripper arm is lowered into the horizontal position where a glass tube is again introduced and is fed further as described above.

If the chucks are arranged horizontally opposite the supply trough, the pivotation can be omitted and it is then sufficient for the glass tube to be brought into a central position with respect to the chuck and then advanced into the chuck by means of a push rod 27 which is also guided horizontally, for example.

Obviously the device can be used in any other desired initial and final position apart from the horizontal and vertical working positions shown.

Also it is not necessary for the glass tube to be pushed into the chuck by a separate thrust member but the entire device could equally well be lifted for the feed.

Equally a tubular sleeve or the like could be used in place of clamping jaws.

The stripper also is only necessary when the rubber seal prevents the glass tube from sliding out under its own weight.

The device can be used everywhere where the container or its delivery channel differs from the working direction of the machine.

After the glass tubes have been introduced into the chucks 23 they are automatically shaped by the machine shown by way of example in the drawings.

When blowing in a mould the rotation of the chucks can be interrupted in that for example the drive of the working point in operative position is disengaged by means of a claw coupling.

In this way it is possible to perform shapings which depart from circular cross sections. Also the softened glass tube can be blown in a mould provided with a thread for example.

The molding mechanism shown in Figures 6 and 7 and which represents one embodiment by way of example will now be described.

Secured on the frame 101 is a hollow centre column 102 in which is journalled the shaft 103 to the upper end of which is rigidly secured the eight-armed spider or disc 104 and to the lower end of which is rigidly secured the holding disc 105. Chucks 23 subjected to spring pressure are rotatably arranged in bearings 106 on the upper disc 104. The chucks are driven from the main shaft 119 and the driving shaft 120 by way of the gear wheels 108, 109, 110, 111, 112, 113, by way of the shaft 115 journalled at 114, the bevel gears 116, 116', chain and chain wheels 117, 117', 118.

The step by step motion of the disc 104 is effected by way of the bevel gears 121, 121' which rotate the feed disc 122 and the locking disc 123 and on each rotation of the discs 123, 122 the disc 104 is moved through an eighth division.

The gear wheel 111 is in engagement with all eight gear wheels 110 and rotates them continuously. The intermediate wheels 109 and 110 are provided with a tooth coupling. Whereas the wheel 109 is only rotatably arranged the wheel 110 is displaceable on the bolt 125. At the upper end of the wheel 110 is an annular groove 126 in which engages a double lever 127. This is actuated by the lever 128, the link 129, the cam 130 and the cam lever 131.

Displaceable on the hollow shaft 132 is the blast head carrier 133 which is raised and lowered by means of the cam 134 by way of lever 135, rod 136, plate 137. The blast head 138 is connected with the valve 140 by means of an air conduit and the valve is opened and closed by means of the cam 141 and lever 142. Compressed air is supplied to the valve 140 from a suitable source.

The blast head 138 is rotatably mounted in the carrier 133 and when lowered abuts against the sealing head 143 which is provided at the upper end of each chuck 23. Within the chuck 23 is an apertured sprung receiver to the lower end of which the open glass tube is applied to form an air tight joint whereas the upper end forms the connection to the air supply conduit. In addition the glass tube is held by the clamping jaws of the chuck. The heating burners 145 are arranged on the ring 144 so as to be adjustable in respect of height and laterally.

The mould jaws 146, 146' are secured to the sliding members 147, 147' which are mounted in the bearing bracket 150 by two parallel rods 148, 148' provided at one end with teeth in which the pinion 149 engages, and are opened and closed by means of the lever 151, the thrust rod 152, link 153, cam 154. The closing occurs under the action of the spring 155. The mould carrier 150 is adjustable in height in the mounting 156 by means of the adjusting screw 157.

The mode of operation of the machine described above for shaping is as follows:

After the glass tube has been brought into the chuck 23 by the feed device according to Figs. 1-3, the latter passes in succession in the further rotation of the disc 104 the heating burners 145 so that the lower closed end of the tube is softened to the extent which is requisite for the shaping. In the further motion of the glass tube from the position IV into the mould position V the mould jaws 146, 146' are opened so that the glass tube can be placed between them. The jaws are closed under the action of the spring 155 because the cam 154 is so shaped that the blast linkage actuating the mould yields. The blast head 138 is now lowered on to the connecting head 143 and when the valve 140 is opened by the cam 141 air is blown into the glass tube so that the wall of the glass tube is brought into contact with the mould. At the same time the drive of the chuck is interrupted in that the cam 130 releases the toothed wheel coupling 126 by means of the linkage 131, 129, 128, 127. The blowing in of air is terminated by closing the valve 140, at the same time the blast head 138 is lifted, the mould jaws opened and the shaped body is advanced into the position VI for the purpose of subsequent cooling and fire polishing. In the position VII the glass body is removed from the chuck and in the position VIII a new one is introduced. After completing the blast period in the position V the toothed wheel coupling again occasions the drive so that the shaped glass bodies are again rotated during the subsequent cooling.

When the position I is reached a new cycle of operations commences.

The construction of the arrangement for interrupting the drive may be of any suitable kind. Thus the drive which is absent in the moulding position can be effected by means of gear wheels or friction discs for example in the individual working positions.

What I claim is:—

1. In a machine for molding glass tubes in combination a molding mechanism and a feeding mechanism comprising a container for a supply of glass tubes, means for presenting the individual tubes from said container to said molding mechanism, and means for pushing the tubes into position to be engaged by said molding mechanism.

2. In a machine for molding glass tubes in combination a molding mechanism and a feeding mechanism comprising a container for a supply of glass tubes, a reciprocating pusher for selecting individual tubes from said container and for presenting the tubes to said molding mechanism, a beveled edge at the top of said pusher, and means for pushing the tubes into position to be engaged by said molding mechanism.

3. In a machine for molding glass tubes in combination, a molding mechanism and a feeding mechanism comprising a container for a supply of glass tubes, means for presenting the individual tubes from said container to said molding mechanism, and means adapted to move in the axial direction of the tubes for pushing the tubes into position to be engaged by said molding mechanism.

4. In a machine for molding glass tubes in combination, a molding mechanism and a feeding mechanism comprising a container for a supply of glass tubes, oscillating means for presenting the individual tubes from said container to said molding mechanism, and means for pushing the tubes into position to be engaged by said molding mechanism.

5. In a machine for molding glass tubes in combination a molding mechanism and a feeding mechanism comprising a container for a supply of glass tubes, oscillating means for presenting the individual tubes from said container to said molding mechanism, jaws on said oscillating means for engaging the individual tubes, means controlled by the movement of said oscillating means for operating said jaws so as to engage and release the tubes, and means for pushing the tubes into position to be engaged by said molding mechanism.

6. In a machine for molding glass tubes in combination a molding mechanism and a feeding mechanism comprising a container for a supply of glass tubes, a reciprocating pusher for selecting individual tubes from said container, oscillating means for presenting the individual tubes from said container to said molding mechanism, jaws on said oscillating means for engaging the individual tubes, means controlled by the movement of said oscillating means for operating said jaws so as to engage and release the tubes, means also controlled by the movement of said oscillating means for reciprocating said pusher, and means for pushing the tubes into position to be engaged by said molding mechanism.

7. In a machine for molding glass tubes in combination a molding mechanism and a feeding mechanism comprising a container for a supply of glass tubes, an oscillating gripper arm, gripping jaws on said arm for engaging the tubes, means for moving said gripper arm into a position in which it is adapted to receive a tube between its jaws, means for selecting a tube from said container and for moving it into position between said jaws, means for moving said gripper arm into a position in which it presents the tube to said molding mechanism, means controlled by the movement of said gripper arm for opening out said jaws in the tube-receiving position of said arm, for closing said jaws on the tube in the tube-presenting position of said arm, and for pushing the tube into position to be engaged by said molding means; and means for operating said jaws so as to release said tube during the operation of said pushing means.

8. In a machine for molding glass tubes in combination a molding mechanism and a feeding mechanism comprising a container for a supply of glass tubes, an oscillating gripper arm, gripping jaws on said arm for engaging the tubes, means for moving said gripper arm into a position in which it is adapted to receive a tube between its jaws, means for selecting a tube from said container and for moving it into position between said jaws, means for moving said gripper arm into a position in which it presents the tube to said molding mechanism, means controlled by the movement of said gripper arm for opening out said jaws in the tube-receiving position of said arm, for closing said jaws on the tube in the tube-presenting position of said arm, a push rod which is so positioned as to be axially aligned with the tube in the tube-presenting position of said arm, for pushing the tube into position to be engaged by said molding means; and means for operating said jaws so as to release said tube during the operation of said pushing means.

9. In a machine for molding glass tubes, a rotary molding mechanism, chucks on said rotary mechanism, means for indexing said rotary mechanism through several operating stations, tube-treating means at individual stations, a feeding mechanism at one of said stations, comprising a container for a supply of glass tubes, means for presenting the individual tubes from said container to said chucks as they are arrested at said last-mentioned station, and means for pushing the tubes into said chucks.

10. In a machine for molding glass tubes, a rotary molding mechanism, chucks on said rotary mechanism, means for indexing said rotary mechanism through several operating stations, tube-treating means at individual stations, a feeding mechanism at one of said stations comprising a container for a supply of glass tubes, means for presenting the individual tubes from said container to said chucks as they are arrested at said last-mentioned station, means for pushing the tubes into said chucks, means at said last-mentioned station for closing said chucks on the tubes, and means at another station for stripping the finished tubes from said chucks.

11. In a machine for molding glass tubes, a rotary molding mechanism, chucks on said rotary mechanism, means for rotating said chucks, means for throwing out said chuck-rotating means, means for indexing said rotary mechanism through several operating stations, tube-treating means at individual stations, a feeding mechanism at one of said stations comprising a container for a supply of glass tubes, means for presenting the individual tubes from said container to said chucks as they are arrested at said last-mentioned station, and means for pushing the tubes into said chucks.

JAKOB DICHTER.